US009230091B2

(12) United States Patent
LaMacchia et al.

(10) Patent No.: US 9,230,091 B2
(45) Date of Patent: *Jan. 5, 2016

(54) MANAGING USE OF A FIELD PROGRAMMABLE GATE ARRAY WITH ISOLATED COMPONENTS

(75) Inventors: Brian A. LaMacchia, Seattle, WA (US); Edmund B. Nightingale, Redmond, WA (US); Paul Barham, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/528,400

(22) Filed: Jun. 20, 2012

(65) Prior Publication Data

US 2013/0346758 A1 Dec. 26, 2013

(51) Int. Cl.
*G06F 21/76* (2013.01)
*G06F 21/44* (2013.01)
*G06F 21/85* (2013.01)

(52) U.S. Cl.
CPC .............. *G06F 21/445* (2013.01); *G06F 21/76* (2013.01); *G06F 21/85* (2013.01)

(58) Field of Classification Search
CPC ........ H04L 19/006; H04L 19/08; G06F 21/76
USPC ....................................................... 713/190
See application file for complete search history.

(56) References Cited

U.S. PATENT DOCUMENTS

| 5,748,979 A | 5/1998 | Trimberger |
| 5,752,035 A | 5/1998 | Trimberger |
| 5,915,025 A | 6/1999 | Taguchi et al. |

(Continued)

FOREIGN PATENT DOCUMENTS

| CN | 2650231 | 10/2004 |
| CN | 102119390 | 7/2011 |

(Continued)

OTHER PUBLICATIONS

"International Search Report & Written Opinion for PCT Patent Application No. PCT/US2013/046881", Mailed Date: Nov. 29, 2013, Filed Date: Jun. 20, 2013, 9 Pages. (MS# 335448.02).

(Continued)

*Primary Examiner* — William Powers
(74) *Attorney, Agent, or Firm* — Aneesh Mehta; Ramesh Kuchibhatla; Micky Minhas

(57) ABSTRACT

Field programmable gate arrays can be used as a shared programmable co-processor resource in a general purpose computing system. Components of an FPGA are isolated to protect the FPGA and data transferred between the FPGA and other components of the computer system. For example, data written by the FPGA to memory is encrypted, and is decrypted within the FPGA when read back from memory. Data transferred between the FPGA and other components such as the CPU or GPU, whether directly or through memory, can similarly be encrypted using cryptographic keys known to the communicating components. Transferred data also can be digitally signed by the FPGA or other component to provide authentication. Code for programming the FPGA can be encrypted and signed by the author, loaded into the FPGA in an encrypted state, and then decrypted and authenticated by the FPGA itself, before programming the FPGA with the code.

19 Claims, 7 Drawing Sheets

(56) References Cited

U.S. PATENT DOCUMENTS

| | | | |
|---|---|---|---|
| 6,557,156 B1 | 4/2003 | Guccione | |
| 6,704,816 B1 | 3/2004 | Burke | |
| 6,907,126 B2 * | 6/2005 | Inada | 380/255 |
| 6,941,538 B2 | 9/2005 | Hwang et al. | |
| 7,028,283 B1 | 4/2006 | Keller et al. | |
| 7,134,025 B1 | 11/2006 | Trimberger | |
| 7,587,699 B2 | 9/2009 | McCubbrey | |
| 7,669,168 B1 | 2/2010 | Patterson | |
| 7,702,927 B2 | 4/2010 | Devadas et al. | |
| 7,711,964 B2 * | 5/2010 | Van Essen et al. | 713/189 |
| 7,788,502 B1 | 8/2010 | Donlin et al. | |
| 7,870,223 B2 | 1/2011 | Grgic et al. | |
| 7,908,476 B2 | 3/2011 | Kandasamy et al. | |
| 7,975,062 B2 | 7/2011 | Krikorian et al. | |
| 8,065,517 B2 * | 11/2011 | Cizas et al. | 713/156 |
| 8,230,374 B2 | 7/2012 | McCubbrey | |
| 8,369,460 B1 | 2/2013 | Su | |
| 8,417,965 B1 * | 4/2013 | Sundararajan et al. | 713/189 |
| 8,448,122 B1 | 5/2013 | Suthar et al. | |
| 8,516,268 B2 * | 8/2013 | Woodall | 713/189 |
| 8,612,409 B2 | 12/2013 | Tomkins et al. | |
| 8,620,967 B2 | 12/2013 | Wessling | |
| 8,620,996 B2 | 12/2013 | Athale et al. | |
| 8,621,008 B2 | 12/2013 | Chebiyyam | |
| 8,627,052 B2 | 1/2014 | Mohrmann et al. | |
| 2001/0037457 A1 * | 11/2001 | Inada | 713/189 |
| 2001/0043082 A1 * | 11/2001 | Wittig et al. | 326/39 |
| 2003/0086300 A1 | 5/2003 | Noyes et al. | |
| 2003/0110463 A1 | 6/2003 | Kuhlmann et al. | |
| 2003/0172303 A1 * | 9/2003 | Adusumilli | 713/201 |
| 2004/0019765 A1 | 1/2004 | Klein, Jr. | |
| 2004/0049672 A1 | 3/2004 | Nollet et al. | |
| 2004/0060032 A1 | 3/2004 | McCubbrey | |
| 2004/0123258 A1 | 6/2004 | Butts | |
| 2004/0230934 A1 | 11/2004 | Taylor et al. | |
| 2006/0015313 A1 | 1/2006 | Wang et al. | |
| 2006/0015862 A1 | 1/2006 | Odom et al. | |
| 2006/0059373 A1 * | 3/2006 | Fayad et al. | 713/192 |
| 2006/0156406 A1 | 7/2006 | Bantz et al. | |
| 2007/0074045 A1 * | 3/2007 | Van Essen et al. | 713/189 |
| 2007/0129818 A1 | 6/2007 | Andrade et al. | |
| 2007/0277161 A1 | 11/2007 | Herbordt et al. | |
| 2008/0104601 A1 | 5/2008 | Kaneko et al. | |
| 2008/0133899 A1 | 6/2008 | Park et al. | |
| 2009/0119503 A1 * | 5/2009 | Isaakian et al. | 713/153 |
| 2009/0282386 A1 | 11/2009 | Moir et al. | |
| 2009/0288076 A1 | 11/2009 | Johnson et al. | |
| 2009/0293051 A1 | 11/2009 | Krywaniuk | |
| 2010/0202239 A1 * | 8/2010 | Moshayedi et al. | 365/229 |
| 2010/0293356 A1 | 11/2010 | Plunkett et al. | |
| 2011/0145780 A1 | 6/2011 | Chen | |
| 2011/0153981 A1 | 6/2011 | Yancey et al. | |
| 2012/0047371 A1 | 2/2012 | Woodall | |
| 2012/0117549 A1 | 5/2012 | Doyle et al. | |
| 2012/0191967 A1 | 7/2012 | Lin et al. | |
| 2013/0346669 A1 | 12/2013 | Nightingale et al. | |
| 2013/0346979 A1 | 12/2013 | Nightingale et al. | |
| 2013/0346985 A1 | 12/2013 | Nightingale | |

FOREIGN PATENT DOCUMENTS

| | | |
|---|---|---|
| CN | 102324006 | 1/2012 |
| CN | 102377564 | 3/2012 |
| EP | 1930834 A1 | 6/2008 |

OTHER PUBLICATIONS

Notice of Allowance dated Jul. 29, 2014 cited in U.S. Appl. No. 13/528,438.

Office Action dated Aug. 15, 2014 cited in U.S. Appl. No. 13/528,329.

Marescaux, et al., "Run-Time Support for Heterogeneous Multitasking on Reconfigurable SoCs", In Integration, the VLSI Journal—Special Issue: Networks on Chip and Reconfigurable Fabrics, vol. 38, Issue 1, Oct. 2004, 24 pages/.

Shibamura, et al., "Express-1: A Dynamically Reconfigurable Platform Using Embedded Processor FPGA", In IEEE International Conference on Field-Programmable Technology, Dec. 2004, 8 pages.

Huang, et al., "Function-Level Multitasking Interface Design in an Embedded Operating System with Reconfigurable Hardware", In Proceedings of the International Conference on Embedded and Ubiquitous Computing, Dec. 2007, 22 pages.

Vuletic, et al., "Seamless Hardware-Software Integration in Reconfigurable Computing Systems", In IEEE Design & Test of Computers, vol. 22, Issue 2, Mar. 2005, 12 pages.

"International Search Report & Written Opinion for PCT Patent Application No. PCT/US2013/046418", Mailed Date: Sep. 11, 2013, Filed Date: Jun. 18, 2013, 11 pages.

Frigo et al., "Evaluation of the Streams-C C-to-FPGA Compiler: An Applications Perspective", Feb. 13, 2001, Copyright 2001 ACM, (Frigo_2001.pdf; pp. 1-7).

Lysecky et al., "Dynamic FPGA Routing for Just-in-Time FPGA compilation", University of California, Jun. 11, 2004; (Lysecky_2004.pdf; pp. 1-6).

David Max Meisner, "Design of a shared hardware library for multi-core environments in FPGA fabrics", Honor Thesis submitted to Brown University, Apr. 24, 2007; (Meisner_2007; pp. 1-48).

"International Search Report & Written Opinion for PCT Patent Application No. PCT/US2013/046719", Mailed Date: Sep. 11, 2013, Filed Date: Jun. 20, 2013, 10 pages.

"International Search Report & Written Opinion for PCT Patent Application No. PCT/US2013/046871", Mailed Date: Oct. 15, 2013, Filed Date: Jun. 20, 2013, 9 pages.

U.S. Appl. No. 13/528,175, filed Apr. 11, 2014, Office Action.
U.S. Appl. No. 13/528,251, filed Jun. 6, 2014, Office Action.
U.S. Appl. No. 13/528,329, filed Oct. 16, 2013, Office Action.
U.S. Appl. No. 13/528,438, filed Sep. 16, 2013, Office Action.
U.S. Appl. No. 13/528,438, filed Apr. 16, 2014, Notice of Allowance.
Office Action dated Feb. 13, 2015 cited in U.S. Appl. No. 13/528,175.
Office Action dated Feb. 23, 2015 cited in U.S. Appl. No. 13/528,329.
Office Action dated Oct. 17, 2014 cited in U.S. Appl. No. 13/528,175.
Office Action dated Nov. 6, 2014 cited in U.S. Appl. No. 13/528,251.
Office Action dated Jun. 3, 2015 cited in U.S. Appl. No. 13/528,251.
Office Action dated Jun. 4, 2015 cited in U.S. Appl. No. 13/528,329.
Altera Stratix II, "High-Performance, High-Density FPGAs", Nov. 2004 https://www.altera.com/content/dam/altera-www/globalten_US/pdfs/literature/br/br_stx2.pdf.

McNeil, Steven, Solving Today's Design Security Concerns XILINK, WP365 (V1. 2) Jul. 30, 2012 http://www.xilinx.com/support/documentation/white_papersiwp365_Solving_Security_Concerns.pdf.

"Frequently Asked Questions About Altera Stratix III FPGAs", Nov. 2006 https://www.altera.com/content/dam/altera-www/globalien_US/pdfs/literature/pristratixiii_faq_final.pdf.

"First Office Action Issued in Chinese Patent Application No. 201310248192.3, Mailed Date: Oct. 10, 2015, 14 Pages".

* cited by examiner

MANAGING USE OF A FIELD PROGRAMMABLE GATE ARRAY WITH ISOLATED COMPONENTS

BACKGROUND

In most general purpose computers, an operating system is the primary software that manages access to resources within the computer. The primary resources are the central processing unit (CPU), which executes application programs designed to run on the computer, main memory and storage. In some computer architectures, additional processing units (such as multiple cores in a processor) and/or additional processors, called co-processors, may be present. Examples of such co-processors include a graphic processing unit (GPU) and a digital signal processor (DSP). The operating system also manages access to these resources by multiple processes.

A field programmable gate array (FPGA) is a kind of logic device that is commonly used in specialized computing devices. An FPGA typically is used to perform a specific, dedicated function, for which a gate array is particularly well-suited. FPGAs typically are found in peripheral devices, or other specialized hardware, such as a printed circuit board connected to and accessed through a system bus such as a PCI bus. In general, such devices are programmed once, and used many times. Because these devices are programmable, they have an advantage over other specialized logic devices in that they can be updated in the field.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One or more field programmable gate arrays (FPGA) can be used as a shared programmable co-processor resource in a general purpose computing system. An FPGA can be programmed to perform functions, which in turn can be associated with one or more processes. With multiple processes, the FPGA can be shared, and a process is assigned to at least one portion of the FPGA during a time slot in which to access the FPGA. Programs written in a hardware description language for programming the FPGA are made available as a hardware library. The operating system manages allocating the FPGA resources to processes, programming the FPGA in accordance with the functions to be performed by the processes using the FPGA and scheduling use of the FPGA by these processes.

If an FPGA is used as a component of a general-purpose computing platform, it can be susceptible to attacks and execution of insecure code. For example, inspection of data transfers and memory can reveal cryptographic keys, algorithms and other information related to secure operations. To improve security, various components of the FPGA are isolated to protect the FPGA and data transferred between the FPGA and other components of the computer system.

For example, data written by the FPGA to memory is encrypted, and is decrypted within the FPGA when read back from memory. Data transferred between the FPGA and other components such as the CPU or GPU, whether directly or through memory, can similarly be encrypted using cryptographic keys known to the communicating components, whether using shared secret keys or public/private key pairs. Transferred data can also be digitally signed by the FPGA or other component to provide authentication. Code for programming the FPGA can be encrypted and signed by the author, loaded into the FPGA in an encrypted state, and then decrypted and authenticated by the FPGA itself, before programming the FPGA with the code.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides a brief, general description of an example computing environment in which an operating system for managing use of FPGA resources can be implemented. The system can be implemented with numerous general purpose or special purpose computing devices. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 1:
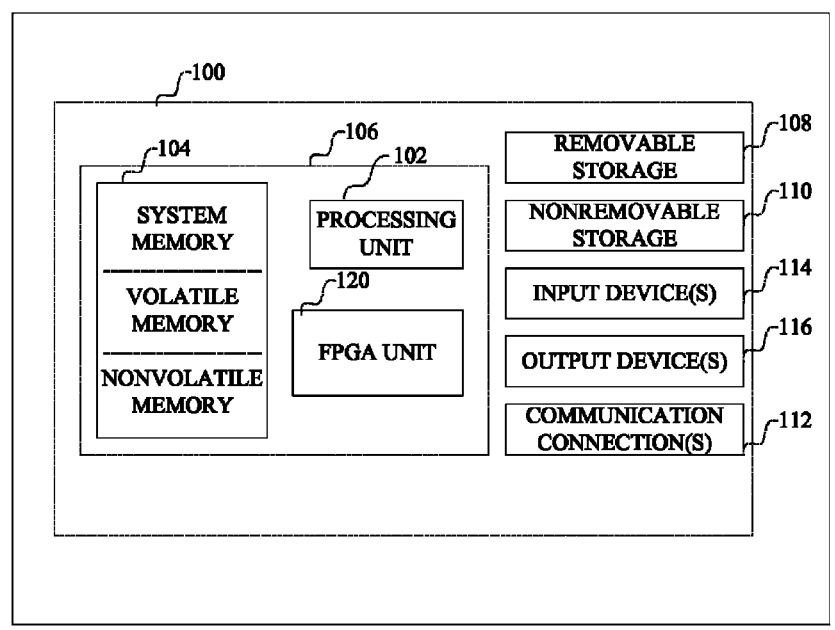
FIG. 1 is a block diagram of an example computing system with FPGA resources for which an operating system can be implemented.

FIG. 1 illustrates merely an example computing environment, and is not intended to suggest any limitation as to the scope of use or functionality of a suitable computing environment.

With reference to FIG. 1, an example computing environment includes a computing device 100. In a basic configuration, computing device 100 includes at least one processing unit 102, such as a typical central processing unit (CPU) of a general purpose computer, and memory 104.

The computing device may include multiple processing units and/or additional co-processing units such as a graphics processing unit (GPU). The computing device also includes one or more field programmable gate arrays (FPGA), denoted as FPGA unit 120 which is available as a shared (among processes running on the computer) co-processing resource. An FPGA may reside in its own CPU socket or on a separate card plugged into an expansion slot, such as a Peripheral Component Interconnect Express (PCI-E) slot. By providing such an FPGA unit, a variety of functions that are well-suited for implementation by a gate array can be implemented with the resulting benefit of hardware acceleration.

Depending on the configuration of the processing unit and the FPGA unit, the unit, or each functional unit within it, has an associated input/output channel for communication with host operating system processes. For example, a memory region dedicated to the functional unit and shared between it and a process using that functional unit can be provided. A sort of request queue and response queue also can be used to enable asynchronous invocation of operations implemented in the FPGA unit. Additionally, state of the functional units in the FPGA unit for a process can be saved to and restored from a memory region for the functional unit and that process. Alternatively other techniques can be used to ensure that the functional unit is in a known state before it is used by its process.

Depending on the configuration and type of computing device, memory 104 may be volatile (such as RAM), nonvolatile (such as ROM, flash memory, etc.) or some combination of the two. This configuration of a processing unit, co-processor and memory is illustrated in FIG. 1 by dashed line 106.

Computing device 100 may also have additional resources and devices. For example, computing device 100 may include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer program instructions, data files, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 also can include communications connection(s) 112 that allow the device to communicate with other devices over a communication medium. The implementation of the communications connection 112 is dependent on the kind of communication medium being accessed by the computing device, as it provides an interface to such a medium to permit transmission and/or reception of data over the communication medium. A communication medium typically carries computer program instructions, data files, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing device 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here.

Applications executed on a computing device are implemented using computer-executable instructions and/or computer-interpreted instructions, such as program modules, that are processed by the computing device. Generally, program modules include routines, programs, objects, components, data structures, and so on, that, when processed by a processing unit, instruct the processing unit to perform particular tasks or implement particular abstract data types. In a distributed computing environment, such tasks can be performed by remote processing devices that are linked through a communications network. In a distributed computing environment, program modules may be located in both local and remote computer storage media including memory storage devices.

An operating system executed on a computing device manages access to the various resources of the computer device by processes. Typically, running an application on the computer system causes one or more processes to be created, with each process being allocated to different resources over time. If a resource is shared among processes, and if the processes cannot share the resource concurrently, then the operating system schedules access to the resource over time. One of such resources is the FPGA unit 120 of FIG. 1, which can include one or more discrete FPGA's.

Figure 2:
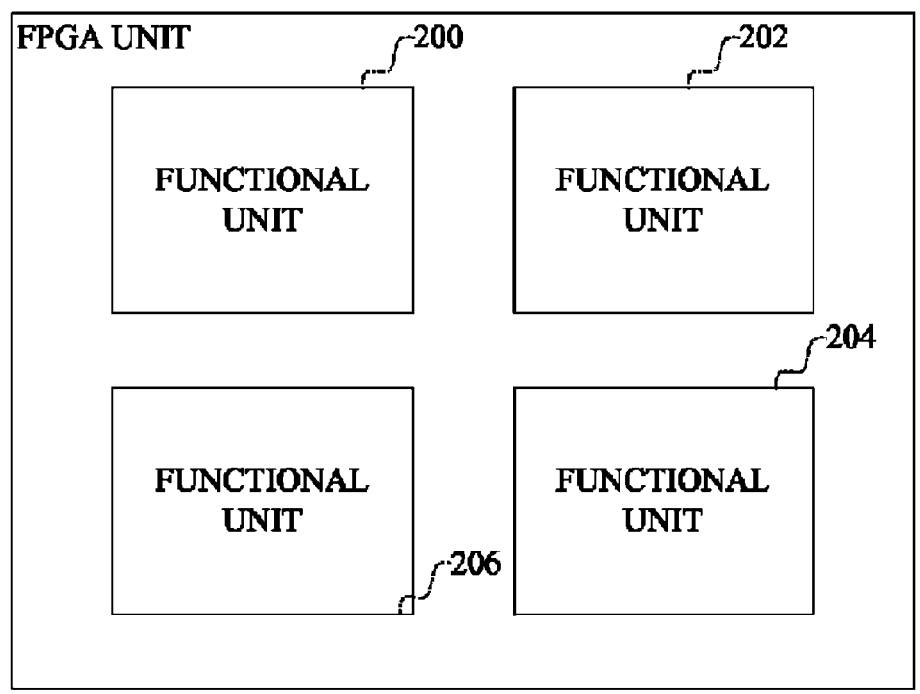
FIG. 2 is a schematic diagram of an illustrative example of FPGA functional units.
Figure 3:
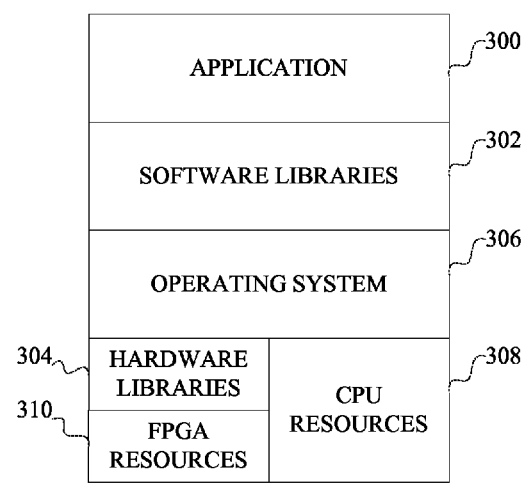
FIG. 3 is a schematic diagram of an example architecture of an application using hardware and software libraries on a computer system with FPGA resources.

Referring to FIG. 2, one of the resources within the FPGA unit is one or more groups of programmable gates, herein called functional units. Each functional unit is defined by a set of gates and/or other resources in the gate array. In general, functional units are nonoverlapping, i.e., do not share programmable elements within the gate array. For example, as illustrated schematically in FIG. 2, functional units 200, 202, 204 and 206 are non-overlapping. Most FPGAs have only one functional unit. The FPGA unit 120 in FIG. 1, however, can have one or more FPGAs. With multiple FPGAs, each FPGA can be considered a functional unit. Referring to FIG. 3, each functional unit is a resource that can be assigned to one or more processes, programmed by the operating system using a hardware library that implements an operation, and then used by the processes assigned to it to perform the operation. Referring to FIG. 3 as an example, an application 300 can use conventional software libraries 302, and FPGA hardware libraries 304, to perform various operations. If an application relies on a hardware library 304, then the operating system 306 uses the hardware library to program the FPGA resources 310 to allow the application 300 to use the library. The FPGA can be programmed prior to the application beginning execution. If an FPGA can be reprogrammed quickly enough, the library can be loaded into the FPGA in a scheduling quantum of the operating system. The operating system 306 also executes software commands from the application 300 and software libraries 302 on the CPU 308. When the application makes calls to functions performed by a software library, the operating system executes the function from the software library on the CPU 308. When the application makes calls to functions performed by the FPGA, the operating system ensures that the FPGA is programmed using the hardware library and executes the function using the FPGA.

Figure 4:
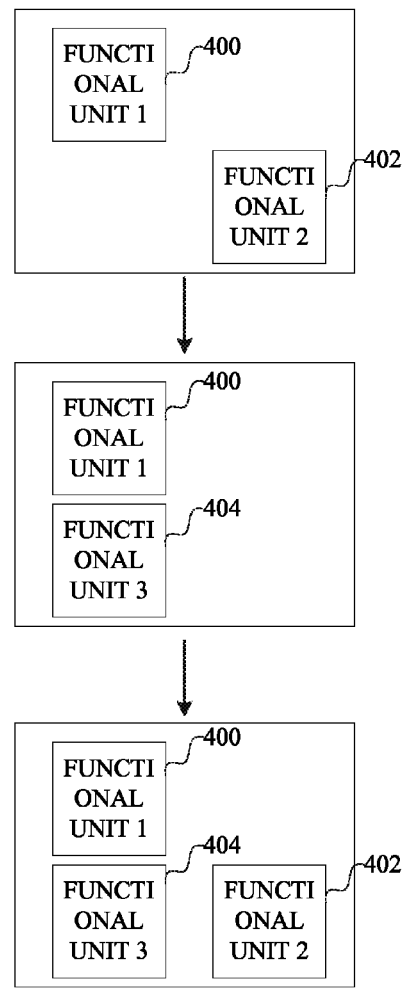
FIG. 4 is a diagram illustrating the use of FPGA resources over time.

To illustrate how different functional units can be used over time, reference is now made to FIG. 4. In FIG. 4, at time T1, functional units 400 and 402 are being used. At time T2, functional units 400 and 404 are being used. At time T3, functional units 400 and 402 are again being used. At time T1, functional unit 400 can be assigned to process P1, and functional unit 402 can be assigned to process P2. At time T2, process P2 may be inactive, and process P1 can use functional unit 400 and process P3 can use functional unit 404. At time T3, another process can start using functional unit 400, such as process P4; and process P2 can be active again at use functional unit 402. With current FPGA implementations, the use of multiple functional units at the same time by different processes implies the use of multiple FPGAs. To the extent that an FPGA can support multiple functional units being used by different processes at the same time, these functional units can be on the same FPGA. Effectively, the operating system is statistically multiplexing the FPGA in both time and space.

To allow such usage of the FPGA resources by different processes over time, the operating system has a scheduler that determines which process has access to the FPGA resources at each scheduling quantum, i.e., time period, and when an FPGA functional unit will be programmed with a hardware library so that the functional unit is available to be used by that process. Thus, an implementation of a scheduler for the FPGA unit is dependent in part on the nature of the FPGA unit and the one or more FPGAs it includes. Factors related to the FPGAs to be considered include, but are not limited to, the following. For example, in some cases an entire FPGA is refreshed to program a functional unit if one functional unit cannot be programmed independently of other functional units. Another consideration is the speed with which a functional unit can be programmed, and whether programming of a functional unit prevents other functional units from being used during that programming phase. Another factor to consider is whether processes can share a hardware library by sharing a functional unit. The scheduler also takes into account such factors as the number of concurrent processes, application performance guarantees, priority of applications, process context switching costs, access to memory and buses, and availability of software libraries if no functional unit is available within the FPGA unit.

There may be other instances where the FPGA unit provides a general purpose facility to applications or the operating system, which therefore are scheduled for the length of an application instantiation. For example, custom network protocols or offloading can be offered as an accelerated service on the FPGA unit. System calls or standard library calls, normally executed in a general purpose CPU, can be accelerated using the FPGA unit instead. Further, the operating system can multiplex the CPU based on preferences for process priority. In another instance, the operating system can use a profile of an application, generated statically or dynamically, to predict the functionality best suited for running on an FPGA unit and then pre-load that functionality so that it is available for scheduling. By using the profile as a guide, the operating system can ensure there is both space and time available on the FPGA unit to accelerate the application. Finally, the operating system can use simple hints from the application to know when to schedule time on the FPGA unit. For example, certain calls into the operating system (system calls) can denote long delays (calls to disk or the network), which provides a hint that the FPGA unit can be free for some amount of time for other threads or processes to use. Therefore, the operating system uses a variety of hints and preferences to create a schedule to multiplex access to the FPGA unit. Because the operating system controls the scheduler, it has detailed knowledge of executing and pending work, available hardware libraries, and time it takes to program an FPGA. Therefore, it can use this knowledge to determine which processes leverage the FPGA during execution.

Having now described a general overview of such computer architecture, an example implementation will now be described.

Figure 5:
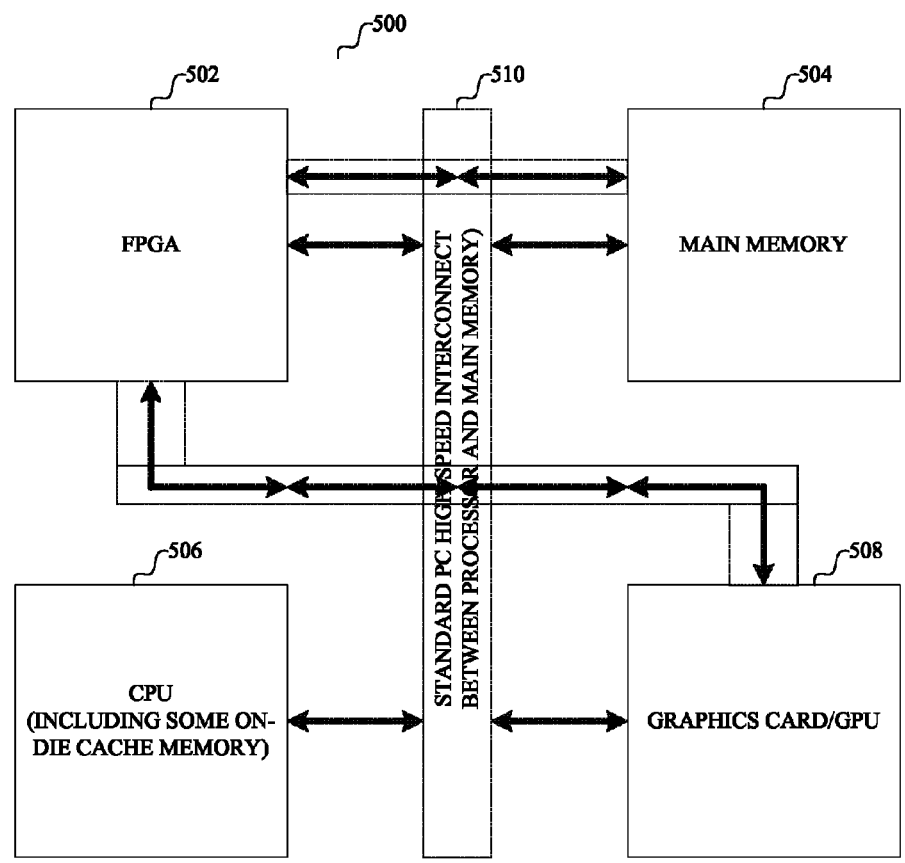
FIG. 5 is a block diagram of a computer system with a field programmable gate array supporting isolated components.

Referring to FIG. 5, a general architecture of a computer system 500 using a field programmable gate array 502 with isolated components is shown. The FPGA connects to a memory 504, central processing unit 506 and graphical processing unit 508 in this example. This connection is provided over a conventional high speed computer bus 510, such as a CPU socket with a hyper transport bus, PCI, PCI-E or PCI-X bus.

The field programmable gate array can include one or more registers that include cryptographic keys, such as a symmetric key or public/private key pair. It also includes the capability of performing the corresponding cryptographic operations using those keys. The cryptographic components can be part of the programming of the programmable elements of the FPGA. Such components can be implemented with countermeasures to increase the difficulty of direct analysis of the chip such as can be done with a trusted platform module (TPM) component.

In one implementation, the cryptographic keys can be stored in a TPM component, from which the FPGA can load such keys only when the keys are being used. If the TPM has access to the public key of a public/private pair held by the FPGA, then the TPM can encrypt the keys it holds to the FPGA using the FPGA's public key. Thus, the keys themselves are only decrypted after being transported from the TPM to the FPGA. This configuration permits the encrypted keys to be transported over an insecure bus, such as the standard PC high speed interconnect.

A logical channel is created between the FPGA 502 and main memory 505 by encrypting all data before it leaves the FPGA with a symmetric key, storing the encrypted data in the main memory. Subsequently, when encrypted data is read back from main memory into the FPGA, the encrypted data is decrypted with the symmetric key inside the FPGA. In one implementation, the encryption of the data also can include integrity protection. For example, an authenticated encryption mode of operation for the symmetric cipher can be used. As another example, data can be hashed and the hash values can be appended to the data, and then the data with appended hash values can be encrypted, before being written to main memory.

A logical channel is created between the FPGA 502 and the graphics processing unit (GPU) 508, or other component such as the CPU or peripheral, through mutual authentication and key transport protocols. In this case the FPGA uses a public/private key pair to authenticate itself to the component, e.g. GPU, and the component uses a second public/private key pair (with the private key known only to the GPU) to do the same. As part of the mutual authentication process, the FPGA and GPU establish one or more shared secrets (e.g., two shared secrets, one for integrity protection and one for confidentiality). These shared secrets are then used to encrypt and authenticate subsequent communications between the FPGA and the GPU as part of a secure session between the two components.

Figure 6:
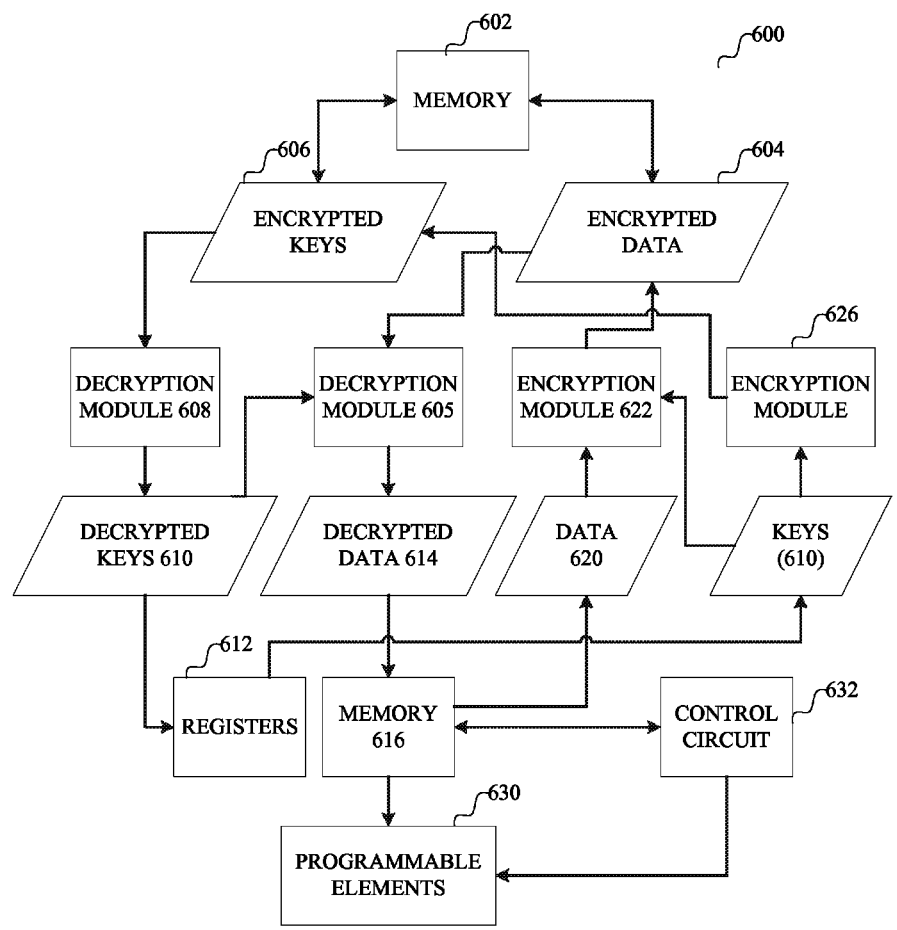
FIG. 6 is a more detailed block diagram of a field programmable gate array.

Referring now to FIG. 6, more details of a field programmable gate array providing isolated components will now be shown.

The FPGA 600 includes an input/output memory 602 through which encrypted data 604 and encrypted keys 606 are transmitted.

When received from other devices, the encrypted data 604 is decrypted by decryption module 605 (which may implement, for example, symmetric key cryptographic operations). In some cases, encrypted keys 606 (which may be used by the decryption module 605) are received and are decrypted by decryption module 608 (which may implement, for example, public/private key cryptographic operations). The decrypted keys 610 may be stored in registers 612. Decrypted data 614 otherwise may be stored in memory 616.

When transmitting to other devices, data 620 (such as from memory 616) is encrypted by encryption module 622 (which may implement, for example, symmetric key cryptographic operations) to provide encrypted data 604. The encryption module 622 can use the keys 610 stored in the registers 612. In some cases, the encryption module 626 (which may implement, for example, public/private key cryptographic operations) may encrypt the keys 610 used by the encryption module 622 for transmission as encrypted keys 606. The encrypted data 604 and keys 606 can be stored in the memory 602 prior to transmission to another component in the computer system, such as a memory, GPU, CPU, peripheral card or other device.

The memory 616 in general can be accessed by the programmable elements 630 of the FPGA, for both reading and writing of data. It is possible to have some registers that can be only read by the programmable elements, but not modified.

The data received in the memory 616 also can be the programming code for programming a functional unit of the FPGA unit. A control circuit 632 reads the programming code from the memory 616 and programs the programmable elements 630. As will be described in more detail below, such a structure allows encrypted and signed code to be securely downloaded to the FPGA, where it is authenticated and decrypted, then used to program the FPGA.

In some implementations, the various cryptographic operations in the decryption modules and encryption modules can be implemented using the programmable elements of the FPGA.

Given such a structure, the FPGA can transfer data securely between itself and other components in the computer system because the data is encrypted on all accessible busses.

For example, to transfer data to other components, the FPGA encrypts data within the FPGA. The encrypted data is then transferred to the main memory or to the component directly.

If the component is the FPGA itself, then encrypted data is read back from main memory into the FPGA, and the encrypted data is decrypted with the key and cryptographic operations inside the FPGA. In this example, the FPGA is using the main memory as additional memory.

The FPGA can use the main memory to transfer data to other components. In this example, the other component reads the encrypted data from memory, and decrypts the data. Thus the CPU, GPU or other component also includes an encryption/decryption module that is similar to the one used in the FPGA.

Similarly, other components can transfer data to the FPGA either directly or through memory. The other component encrypts the data and transfers it to memory or the FPGA. The FPGA then reads the data from memory, or receives it, and then decrypts it.

If decryption uses a shared secret, then the secret also can be transferred to the component from the FPGA (or may have been transferred to the FPGA by the component) either directly, or through the memory. The transfer of a shared secret can be performed using public/private key encryption to protect the secret. In particular, to provide mutual authentication, the FPGA uses a public/private key pair to authenticate itself to the component, e.g. GPU, and the component uses a second public/private key pair with the private key known only to the GPU to do the same.

As part of the mutual authentication process, the FPGA and GPU establish one or more shared secrets (e.g., two shared secrets, one for integrity protection and one for confidentiality). These shared secrets are then used to encrypt and authenticate for subsequent communications between the FPGA and the GPU as part of a secure session between the two components.

As another example, shown in FIG. 7, a process for securely programming the FPGA will now be described.

In general, securely programming an FPGA involves receiving encrypted program logic into memory. The encrypted program logic is decrypted within the field programmable gate array and into memory in the FPGA. The programmable elements of the field programmable gate array are then programmed using the decrypted program logic.

Figure 7:
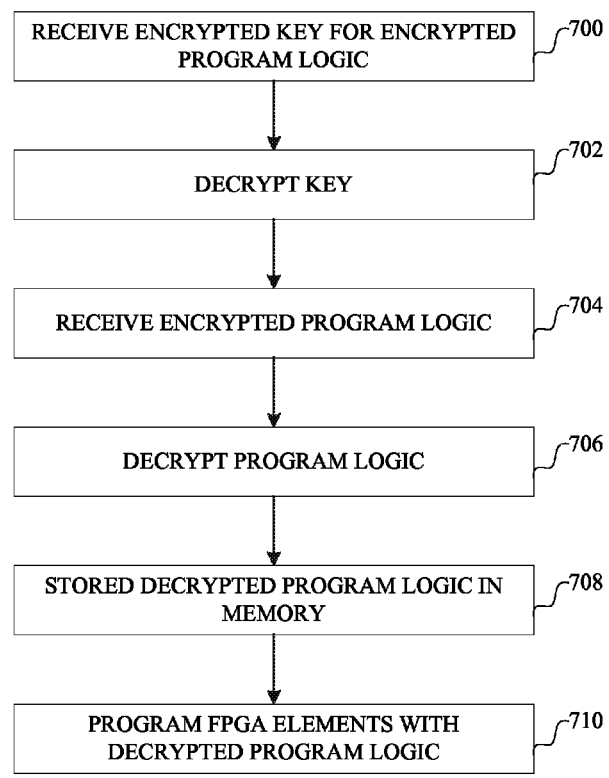
FIG. 7 is a flowchart describing securely programming an FPGA.

As shown in FIG. 7, because the program logic is intended to implement cryptographic operations, it is desirable to ensure that the encrypted program logic is authenticated. For example, the encrypted program logic can be encrypted with an authenticating encryption protocol, or the encrypted program logic can include a digital signature over the unencrypted program logic. In one implementation, the encrypted program logic can be encrypted using a symmetric key, which is encrypted using a public key of the FPGA and also digitally signed by a trusted source in a manner that the FPGA is able to cryptographically validate.

The FPGA receives 700 the encrypted symmetric key. The FPGA decrypts 702 the symmetric key using its own private key and authenticates the symmetric key using the public key of the trusted source. The FPGA then receives 704 the encrypted program logic. The FPGA decrypts 706 the encrypted program logic using the decrypted symmetric key, and temporarily stores 708 the decrypted program logic in memory in the FPGA, where it is used by control logic to program 710 programmable elements of the FPGA.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A field programmable gate array (FPGA), comprising:
a plurality of programmable elements; and
isolated FPGA elements enabling secure communication by the field programmable gate array with other components in a computer system, the isolated FPGA elements comprising a first memory and a second memory, the first memory being enabled to receive encrypted data from outside the FPGA and the second memory being isolated during operation from components outside the FPGA and enabled to store data decrypted within the FPGA.

2. The field programmable gate array of claim 1, wherein the isolated FPGA elements comprises a mutual authentication and encryption key module enabling encryption and authentication of data communicated between the FPGA and other components of the computer system.

3. The field programmable gate array of claim 2, wherein the mutual authentication and encryption key module comprises a program loading section comprising:
the first memory enabled to receive input data including encrypted program logic and at least one encrypted key;
a first decryption module having inputs to receive the encrypted key, a public key corresponding to a sender of the encrypted key, and a private key associated with the FPGA, and having an output providing a decrypted key;

a second decryption module having inputs to receive the decrypted key from the first decryption module and the encrypted program logic from the memory, and having an output providing decrypted program logic;

the second memory enabled to receive and store the decrypted program logic; and control circuitry for using the decrypted program logic from the second memory to program the programmable elements of the FPGA.

4. The field programmable gate array of claim 1, wherein the isolated FPGA elements comprises:

a memory access channel, comprising:

an encryption module having inputs to receive data from the processing elements of the FPGA and outputs providing encrypted data to a memory; and a decryption module having inputs to receive data from the memory and outputs providing decrypted data to the processing elements within the FPGA.

5. The field programmable gate array of claim 1, wherein the isolated FPGA elements comprises:

a communication channel access module, comprising:

an encryption module having inputs to receive data from the processing elements of the FPGA and outputs providing encrypted data to a communication channel; and a decryption module having inputs to receive data from the communication channel and outputs providing decrypted data to the processing elements within the FPGA.

6. The field programmable gate array of claim 1, wherein the isolated FPGA elements comprises isolated registers, comprising:

an encryption module having inputs to receive data from the processing elements of the FPGA and outputs providing encrypted data to a register within the FPGA; and an input module having an input for receiving a request for data from the register and an output providing the encrypted data from the register;

a decryption module having inputs to receive data from the register and outputs providing decrypted data to the processing elements within the FPGA.

7. A method for programming a field programmable gate array (FPGA), comprising:

receiving encrypted program logic into a first memory within the FPGA;

decrypting the encrypted program logic using a decryption module within the FPGA into a second memory within the FPGA, the second memory being isolated during operation within the FPGA from components outside the FPGA; and programming the FPGA using the decrypted program logic.

8. The method of claim 7, further comprising:

receiving an encrypted key for the encrypted program logic into the first memory;

decrypting the encrypted key within the field programmable gate array;

storing the decrypted key in an isolated memory within the FPGA; and using the decrypted key in the decrypting of the encrypted program logic.

9. The method of claim 8, wherein the encrypted key is encrypted using a public key for the field programmable gate array and a private key for a provider of the encrypted program logic.

10. The method of claim 9, wherein the encrypted program logic is encrypted using a symmetric key.

11. In a computer system, a process comprising:

establishing a mutually-authenticated and encrypted secure channel between a field programmable gate array (FPGA) and a computer component, wherein unencrypted data is stored in an isolated memory within the FPGA which is isolated during operation from components outside the FPGA and inaccessible to the computer component; and sending data to the computer component securely over the mutually-authenticated and encrypted secure channel.

12. The process of claim 11, wherein the FPGA includes a second memory, and wherein sending the data securely comprises:

the field programmable gate array encrypting the data stored in the isolated memory and storing the encrypted data in the second memory; and the computer component reading the encrypted data from the second memory and decrypting the data within the computer component.

13. The process of claim 12, wherein the computer component is a central processing unit.

14. The process of claim 12, wherein the computer component is a trusted platform module component.

15. The process of claim 12, wherein the computer component is a storage device.

16. The process of claim 12, wherein the computer component is another computing device with its own field programmable gate array.

17. The process of claim 11, wherein sending the data securely comprises:

the field programmable gate array encrypting the data using a public key for the computer component and a private key of the field programmable gate array and sending the encrypted data to the computer component; and the computer component receiving and decrypting the data within the computer component using a public key for the field programmable gate array and a private key of the computer component.

18. The process of claim 17, wherein the encrypted data includes at least one shared secret.

19. The process of claim 18, further comprising securely sending additional data between the field programmable gate array and the computer component by encrypting and decrypting the additional data using the at least one shared secret.

* * * * *